Sept. 3, 1929.   V. WOICK   1,727,089
DRIVING MEANS FOR MOTOR VEHICLES
Filed Dec. 16, 1925
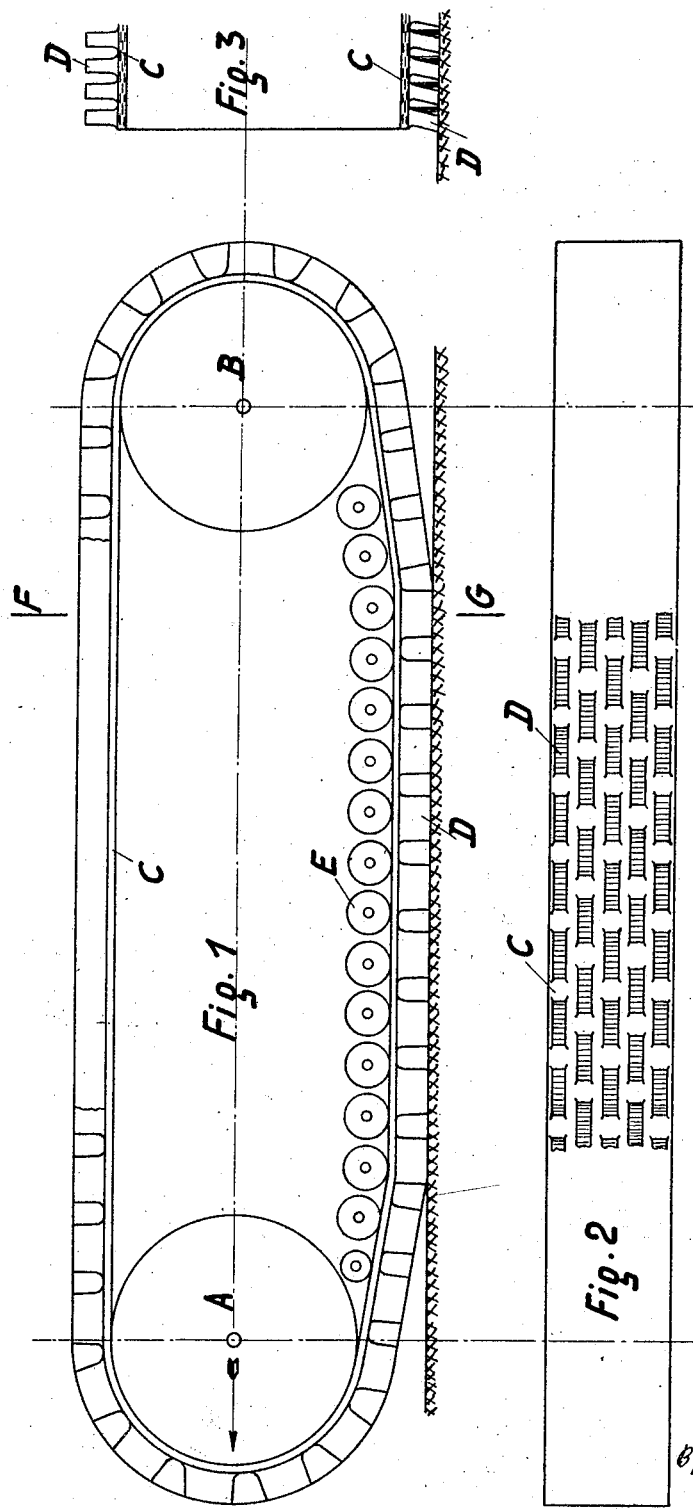

Patented Sept. 3, 1929.

1,727,089

UNITED STATES PATENT OFFICE.

VICTOR WOICK, OF CHARLOTTENBURG, NEAR BERLIN, GERMANY.

DRIVING MEANS FOR MOTOR VEHICLES.

Application filed December 16, 1925, Serial No. 75,879, and in Germany December 29, 1924.

This invention has reference to improvements in endless driving belts particularly adaptable for the operation of motor vehicles and the like, and designed to facilitate the manipulation thereof, to increase the safety from slippage and to generally improve the construction of machines of the kind referred to. Broadly speaking, the invention comprises an endless operating belt which is provided on its tread surface with resilient, elastic projections, preferably of rubber, and comprising in its preferred construction a band of textile fabrics. In accordance with the invention a plurality of rows of rubber studs are arranged side by side, and of such reduced thickness in the transverse direction of the belt, that a lateral bending of these projections will occur in the steering operation and in going around a curve. The projections, or studs are preferably of larger size in the longitudinal direction of the vehicle than transversely thereof, so that they will offer sufficient resistance against bending in the longitudinal direction under the action of the driving force, while in the transverse direction they possess a certain degree of resiliency, so as to admit of lateral deviation in the directing and steering of the vehicle and to thereby facilitate the directing and steering operation.

The invention will be more particularly described with reference to the accompanying drawing showing by way of example and in a somewhat diagrammatic manner an embodiment of the principles of the invention.

Fig. 1 is a side view of the driving means for a motor vehicle.

Fig. 2 is a top plane view thereof.

Fig. 3 is a vertical section on the line F—G of Fig. 1.

Over the drums A and B which are suitably mounted on the vehicle frame the endless driving belt C is guided. It is provided with the rubber studs or projections, D which, as appears particularly from Fig. 2 of the drawing, are stronger or of larger size in the driving direction than transversely thereto. The lower stretch of the driving belt passes over a plurality of smaller rollers E likewise disposed on the vehicle frame and adapted to be freely rotated on their axes. The large rollers or drums A and B, or one of them, are driven in the usual manner.

The novel driving means according to this invention insures very smooth running of the vehicle, and admits of easy manipulation, directing and steering thereof and the wear is comparatively slight. It is very well adapted for tractor vehicles.

The invention has, of course, been described in its broad aspects only and it is, of course, susceptible of modifications and changes in the discretion of the operator and to suit varying conditions of application, without deviating from the scope and spirit of the invention, except as stated in the claims hereunto appended.

I claim:—

1. A tractor chain including a tread surface composed of a plurality of longitudinal rows of elastic projections, said projections being relatively narrow and laterally flexible and the projections of the respective rows being staggered and arranged in break-joint relation.

2. An endless driving belt for motor vehicles comprising a relatively broad tread surface having thereon a plurality of longitudinal rows of elastic projections, said projections being relatively narrow and flexible laterally of the belt.

3. A running belt for motor vehicles having on its tread surface a plurality of elastic projections, said projections being relatively narrow and laterally flexible during steering of the vehicle, the length of said projections being substantially greater in the longitudinal direction of the belt than in the transverse direction.

In testimony whereof I affix my signature.

VICTOR WOICK.